United States Patent
Yi et al.

(10) Patent No.: US 11,172,402 B2
(45) Date of Patent: Nov. 9, 2021

(54) RESTRICTING PDCP CONTROL PDUS ON SPECIFIC LINK

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 16/322,196

(22) PCT Filed: Sep. 28, 2017

(86) PCT No.: PCT/KR2017/010785
§ 371 (c)(1),
(2) Date: Jan. 31, 2019

(87) PCT Pub. No.: WO2018/062884
PCT Pub. Date: Apr. 5, 2018

(65) Prior Publication Data
US 2020/0187050 A1    Jun. 11, 2020

Related U.S. Application Data

(60) Provisional application No. 62/401,845, filed on Sep. 29, 2016.

(51) Int. Cl.
*H04W 28/06* (2009.01)
*H04L 12/805* (2013.01)
(Continued)

(52) U.S. Cl.
CPC .......... *H04W 28/06* (2013.01); *H04L 47/365* (2013.01); *H04W 28/0278* (2013.01); *H04W 84/12* (2013.01)

(58) Field of Classification Search
CPC . H04W 28/06; H04W 28/0278; H04W 84/12; H04W 4/18; H04L 47/365
(Continued)

(56) References Cited

U.S. PATENT DOCUMENTS 9,801,204 B2 * 10/2017 Zhang .............. H04W 72/1284
2009/0052420 A1 * 2/2009 Fischer .............. H04W 72/042
370/338
(Continued)

OTHER PUBLICATIONS

Catt: "Further Discussion on Scheduling Issue for UL Split Bearer in eLWA", R2-164680, 3GPP TSG RAN WG2 Meeting #95, Göteborg, Sweden, Aug. 22-26, 2016.
(Continued)

*Primary Examiner* — Ian N Moore
*Assistant Examiner* — Latresa A McCallum
(74) *Attorney, Agent, or Firm* — Dentons US LLP (57) ABSTRACT

A user equipment (UE) determines whether a size of data available for transmission in a PDCP (Packet Data Convergence Protocol) entity of the UE, excluding a size of a PDCP Control PDU (Protocol Data Unit), exceeds a threshold value. Here, the PDCP Control PDU is predetermined to be transmitted through the first link of the bearer. The PDCP entity of the UE informs an indication on (a) the size of the data available for transmission, or (b) the size of the PDCP Control PDU, to a first entity of the UE for the first link based on the determination, and the first entity can transmit a buffer status report to the network based on the indication. Here, the size of the data available for transmission in the PDCP includes the size of the PDCP Data PDU and the size of the PDCP Control PDU.

8 Claims, 6 Drawing Sheets

(51) Int. Cl.
*H04W 28/02* (2009.01)
*H04W 84/12* (2009.01)

(58) Field of Classification Search
CPC ..... H04L 1/0007; H04L 1/0014; H04L 69/04; H04L 69/32; H03M 7/30
See application file for complete search history.

(56) References Cited

U.S. PATENT DOCUMENTS

| | | |
|---|---|---|
| 2013/0242897 A1 | 9/2013 | Meylan et al. |
| 2016/0014647 A1* | 1/2016 | Yi ..................... H04W 36/0072 370/331 |
| 2016/0192258 A1 | 6/2016 | Ciullo et al. |
| 2016/0212661 A1* | 7/2016 | Basu Mallick ....... H04L 1/1614 |
| 2017/0055283 A1* | 2/2017 | Shrivastava .......... H04W 76/15 |
| 2017/0251403 A1* | 8/2017 | Yi ......................... H04W 24/10 |
| 2019/0098544 A1* | 3/2019 | Han ..................... H04W 36/08 |

OTHER PUBLICATIONS

Huawei: "Issues related to uplink transmission for eLWA", R2-164852, 3GPP TSG RAN WG2 Meeting #94, Nanjing, China, May 23-27, 2016.
Samsung: "Introducing threshold based uplink split operation into the PDCP specification", R2-153336, 3GPP TSG RAN WG1 Meeting #91, Beijing, China, Aug. 24-28, 2015.

* cited by examiner

(a) Control-Plane Protocol Stack (b) User-Plane Protocol Stack

RESTRICTING PDCP CONTROL PDUS ON SPECIFIC LINK

This application is a 35 USC § 371 national stage entry of international application no. PCT/KR2017/010785 filed on Sep. 28, 2017, and claims priority to U.S. provisional application No. 62/401,845 filed on Sep. 29, 2016, all of which are hereby incorporated by reference in their entireties as if fully set forth herein.

TECHNICAL FIELD

The present invention relates to uplink data transmission in a wireless communication system. Specifically, the present invention is directed to buffer status report (BSR) transmission and uplink data transmission considering the restriction on PDCP (Packet Data Convergence Protocol) control PDUs (Protocol Data Units).

BACKGROUND ART

As an example of a mobile communication system to which the present invention is applicable, a 3rd Generation Partnership Project Long Term Evolution (hereinafter, referred to as LTE) communication system is described in brief.

Figure 1:
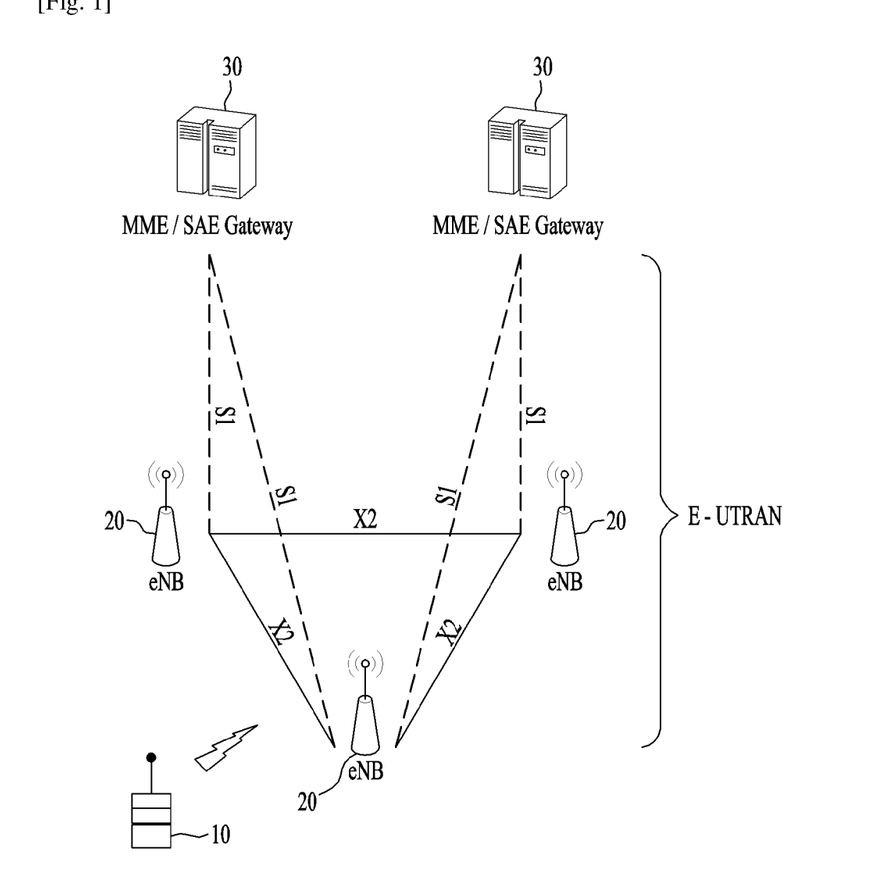
FIG. 1 is a block diagram illustrating network structure of an evolved universal mobile telecommunication system (E-UMTS)

FIG. 1 is a block diagram illustrating network structure of an evolved universal mobile telecommunication system (E-UMTS). The E-UMTS may be also referred to as an LTE system.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB or eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB, gNB etc. However, in the following explanation, the term 'UE' and 'eNodeB' are used for convenience.

Figure 2:
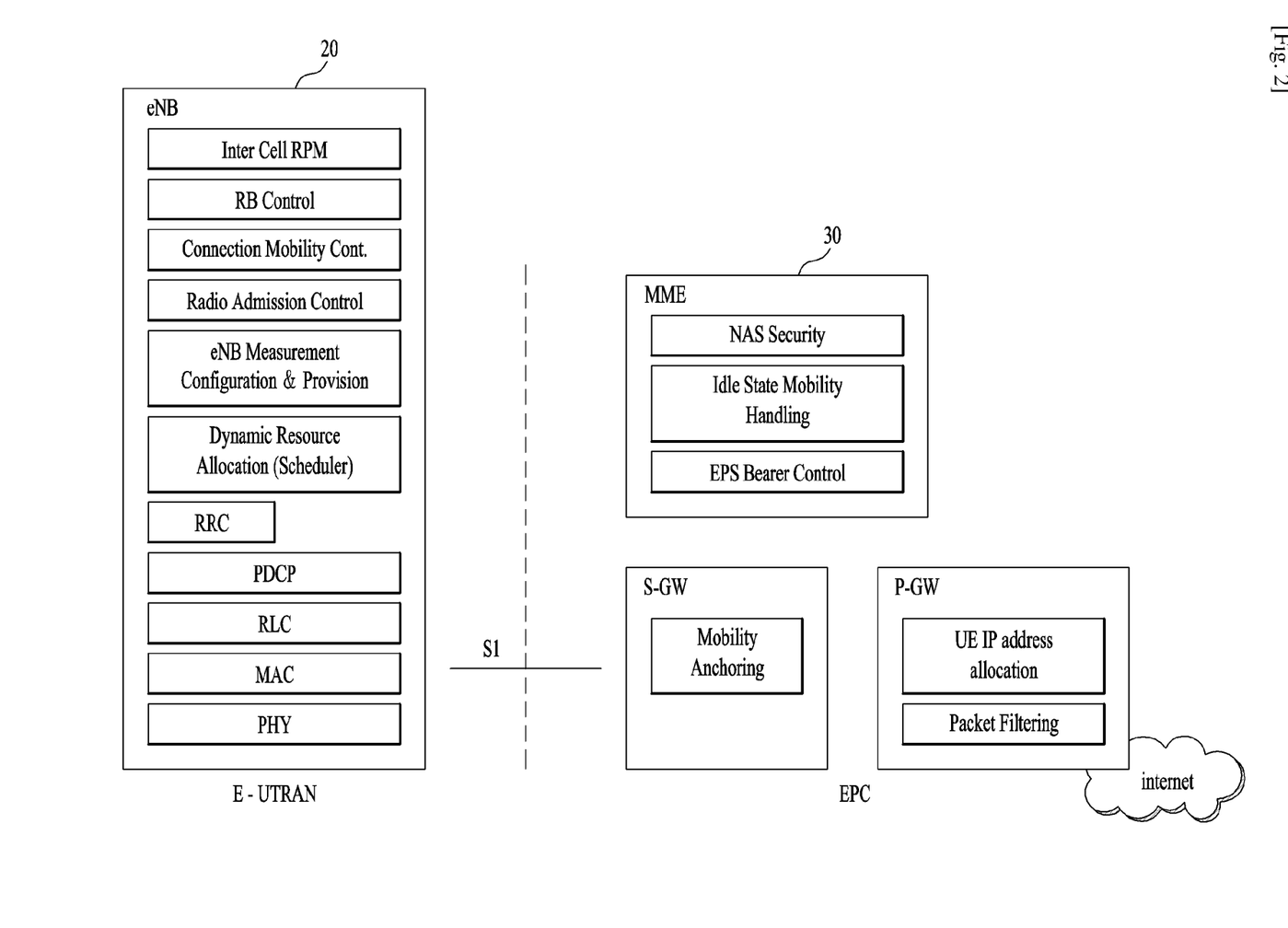
FIG. 2 is a block diagram depicting architecture of a typical E-UTRAN and a typical EPC.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
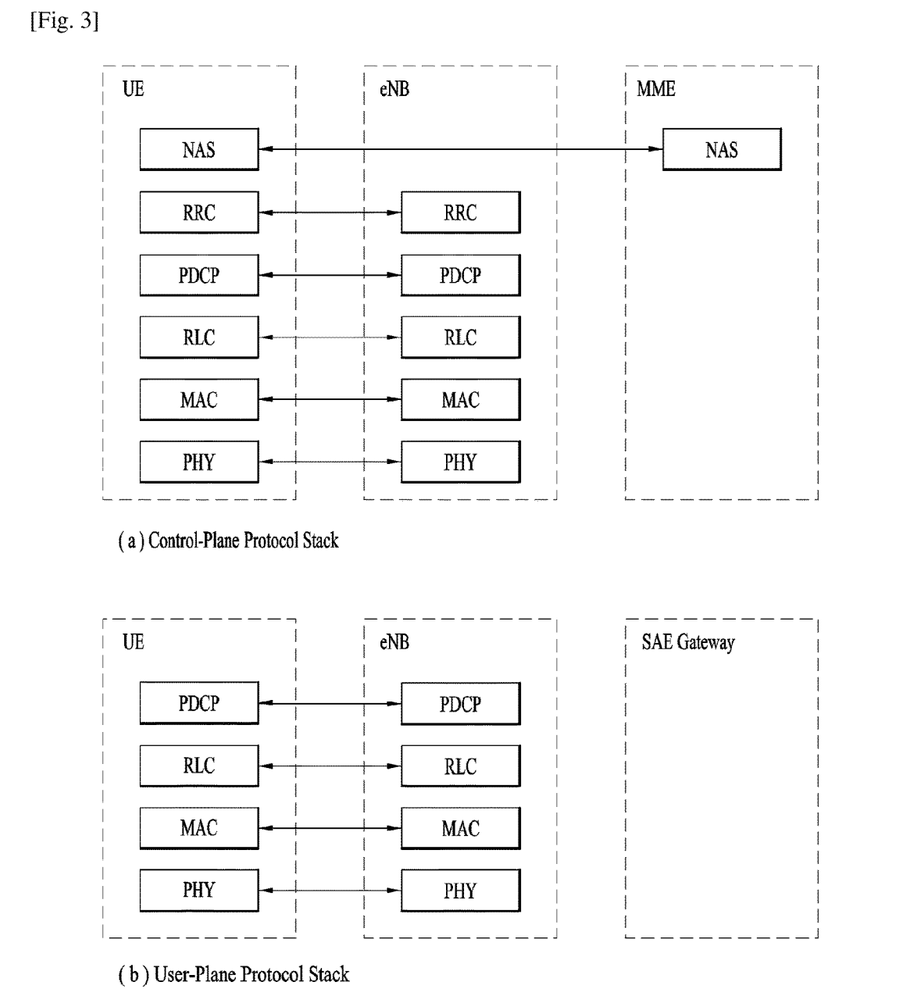
FIG. 3 is a diagram showing a control plane and a user plane of a radio interface protocol between a UE and an E-UTRAN based on a 3GPP radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Recently, new technology using unlicensed spectrum, such as LAA, is explained.

Figure 4:
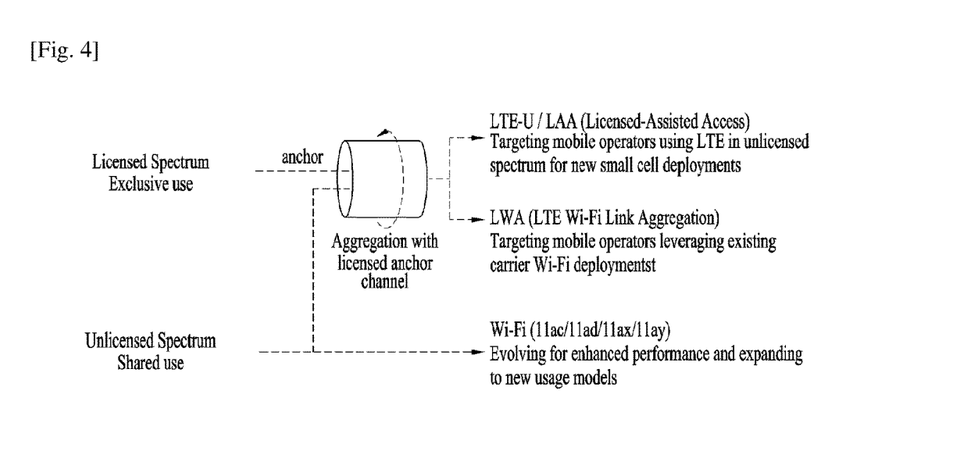
FIG. 4 is a conceptual diagram explaining new technology using unlicensed spectrum.

FIG. 4 is a conceptual diagram explaining new technology using unlicensed spectrum.

As shown in FIG. 4, the unlicensed spectrum for these schemes is supposed as spectrum used for Wi-Fi system, such as IEEE 802.11ac/ad/ax/ay. LTE-U/LAA is directed to aggregate the licensed spectrum, as anchor carrier, with unlicensed spectrum. It is targeting mobile operators using LTE in unlicensed spectrum for new small cell deployment. LWA (LTE Wi-Fi link Aggregation) is also directed to aggregate the LTE link with Wi-Fi link. It is targeting mobile operators leverage existing carrier Wi-Fi deployments.

In LWA, signals can be transmitted either on LTE link or on WLAN link. However, it would be beneficial to restrict important signals to be transmitted on LTE link since WLAN link is subject to loss. While LTE link ensures lossless transmission thanks to RLC AM, the signals transmitted in WLAN link can be lost.

DISCLOSURE OF INVENTION

Technical Problem

So, there needs a study on what type of signals is to be restricted to the LTE link, and how the transmission mechanism would be changed due to this restriction.

Solution to Problem

To achieve the object of the present invention, in one aspect, a method for a user equipment (UE) for transmitting uplink data of a bearer including a first link and a second link to a network, the method comprising: determining whether a size of data available for transmission in a PDCP (Packet Data Convergence Protocol) entity of the UE, excluding a size of a PDCP Control PDU, exceeds a threshold value, wherein the PDCP Control PDU (Protocol Data Unit) is predetermined to be transmitted through the first link of the bearer; informing an indication on, by the PDCP entity of the UE, (a) the size of the data available for transmission, or (b) the size of the PDCP Control PDU to a first entity of the UE for the first link based on the determination; and transmitting, by the first entity, a buffer status report to the network based on the indication, wherein the size of the data available for transmission in the PDCP includes the size of the PDCP data PDU and the size of the PDCP Control PDU, is provided.

The indication may indicate (a) the size of the data available for transmission, when the data available for transmission in the PDCP entity of the UE, excluding the size of the PDCP Control PDU, exceeds the threshold value. The indication may also indicate (a) the size of the data available for transmission, when the data available for transmission in the PDCP entity of the UE when the PDCP data PDU is configured to be transmitted through the first link.

The indication may indicate (b) the size of the PDCP Control PDU, when the data available for transmission in the PDCP entity of the UE, excluding the size of the PDCP Control PDU, does not exceed the threshold value. The indication may also indicate (b) the size of the PDCP Control PDU, when the PDCP data PDU is configured to be transmitted through the second link.

(b) the size of the PDCP Control PDU may be indicated as 0, when there is no PDCP Control PDU available for transmission.

The method may further comprise submitting the data to the first entity of the UE for the first link or a second entity of the UE for the second link based on whether the size of the data available for transmission, excluding the size of the PDCP control PDU, exceeds the threshold value.

The first link may be a LTE (Long Term Evolution) link, and the second link may be a WLAN (Wireless Local Area Network) link.

In another aspect of the present invention, a user equipment (UE) for transmitting uplink data of a bearer including a first link and a second link to a network, the UE comprising: a processor including a PDCP (Packet Data Convergence Protocol) entity, a first entity for the first link, and a second entity for the second link; and a transceiver connected to the processor, wherein the PDCP entity is configured to determine whether a size of data available for transmission in the PDCP entity, excluding a size of a PDCP Control PDU, exceeds a threshold value, wherein the PDCP Control PDU is predetermined to be transmitted through the first link of the bearer, wherein the PDCP entity further configured to inform an indication on: (a) the size of the data available for transmission, or (b) the size of the PDCP Control PDU to the first entity based on the determination; and wherein the first entity is configured to transmit a buffer status report, through the transceiver, to the network based on the indication, and wherein the size of the data available for transmission in the PDCP includes the size of the PDCP Data PDU and the size of the PDCP Control PDU when comparing with the threshold value, is provided.

The indication can indicate (a) the size of the data available for transmission, when the data available for transmission in the PDCP entity, excluding the size of the PDCP Control PDU, exceeds the threshold value.

The indication can indicate (b) the size of the PDCP Control PDU, when the data available for transmission in the PDCP entity, excluding the size of PDCP Control PDU, does not exceed the threshold value.

(b) the size of the PDCP Control PDU can be indicated as 0, when there is no PDCP Control PDU available for transmission.

The PDCP entity may be further configured to submit the data to the first entity of the UE for the first link or the second entity of the UE for the second link based on whether the size of the data available for transmission, excluding the size of the PDCP control PDU, exceeds the threshold value.

Here, the first link can be a LTE (Long Term Evolution) link, and the second link can be a WLAN (Wireless Local Area Network) link.

Advantageous Effects of Invention

According to the present invention, the PDCP control PDU can be safely transmitted to the network without loss.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

In order to figure out what type of signals is to be restricted to the LTE link, the operation of PDCP is explained.

Figure 5:
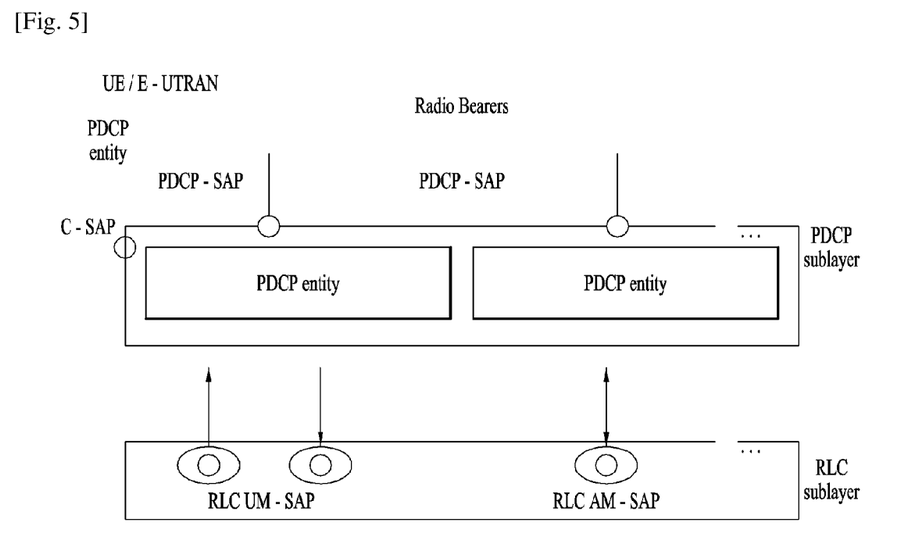
FIG. 5 shows one possible structure for the PDCP sublayer.

FIG. 5 shows one possible structure for the PDCP sublayer.

Each RB (Radio Bearer) (i.e. DRB, SLRB and SRB, except for SRB0 and SRB1bis) is associated with one PDCP entity. Each PDCP entity is associated with one or two (one for each direction) RLC entities depending on the RB characteristic (i.e. unidirectional or bi-directional) and RLC mode. For split bearers, each PDCP entity is associated with two AM RLC entities. For LWA bearers, each PDCP entity is associated with an AM RLC entity and the LWAAP entity. The PDCP entities are located in the PDCP sublayer.

In one embodiment of the present invention, restricting PDCP Control PDU on LTE link in LWA bearer is proposed. Comparing to the PDCP Data PDU, PDCP Control PDU has important information, thus it is important that PDCP Control PDU is not lost.

In one aspect of downlink transmission, restricting PDCP Control PDU on LTE link in DL LWA bearer might be treated as purely an eNB implementation issue. Until Rel-13 of the 3GPP standardization, LWA bearer can be configured only for downlink Thus this restriction on PDCP Control PDU had not been a big issue. However, from Rel-14 of the 3GPP Standardization, LWA bearer can be configured also for uplink And restricting the PDCP Control PDU on LTE link is no more an eNB implementation issue.

In UL LWA bearer, it would be beneficial to transmit PDCP Control PDUs on LTE link with following reasons:

WLAN link is subject to loss, while LTE link ensures lossless transmission thanks to RLC AM.

PDCP entity is located in LTE eNB, and PDCP Control PDU transmitted to WLAN AP experiences long delay due to Xw interface.

Therefore, one embodiment of the present invention proposes a mechanism that can restrict PDCP Control PDU to a specific link (e.g. LTE link) While the following explanations are mainly discuss restricting PDCP Control PDU to LTE link of LWA bearer, this mechanism can be applied to other situation where there are at least two links for one bearer.

In one aspect of this embodiment with regards to restricting PDCP Control PDUs on LTE link is whether the amount of PDCP Control PDUs is excluded or not from the data available for transmission in PDCP when compared with threshold. The comparison with threshold is performed two times, (1) one in indicating data available for transmission in PDCP to MAC entity for BSR, and (2) the other in submitting data to lower layer.

Depending on whether the amount of PDCP Control PDUs is excluded from data available for transmission in PDCP or not, there are two options:

Option1: In comparison with threshold, the amount of PDCP Control PDUs is excluded from data available for transmission in PDCP.

Option2: In comparison with threshold, the amount of PDCP Control PDUs is included in data available for transmission in PDCP.

Proposed PDCP Entities Operation

The PDCP entities are located in the PDCP sublayer. Several PDCP entities may be defined for a UE. Each PDCP entity carrying user plane data may be configured to use header compression.

Each PDCP entity is carrying the data of one radio bearer. In one example of the present invention, only the robust header compression protocol (ROHC), is supported. It would be efficient to suppose that every PDCP entity uses at most one ROHC compressor instance and at most one ROHC decompressor instance.

A PDCP entity is associated either to the control plane or the user plane depending on which radio bearer it is carrying data for.

Figure 6:
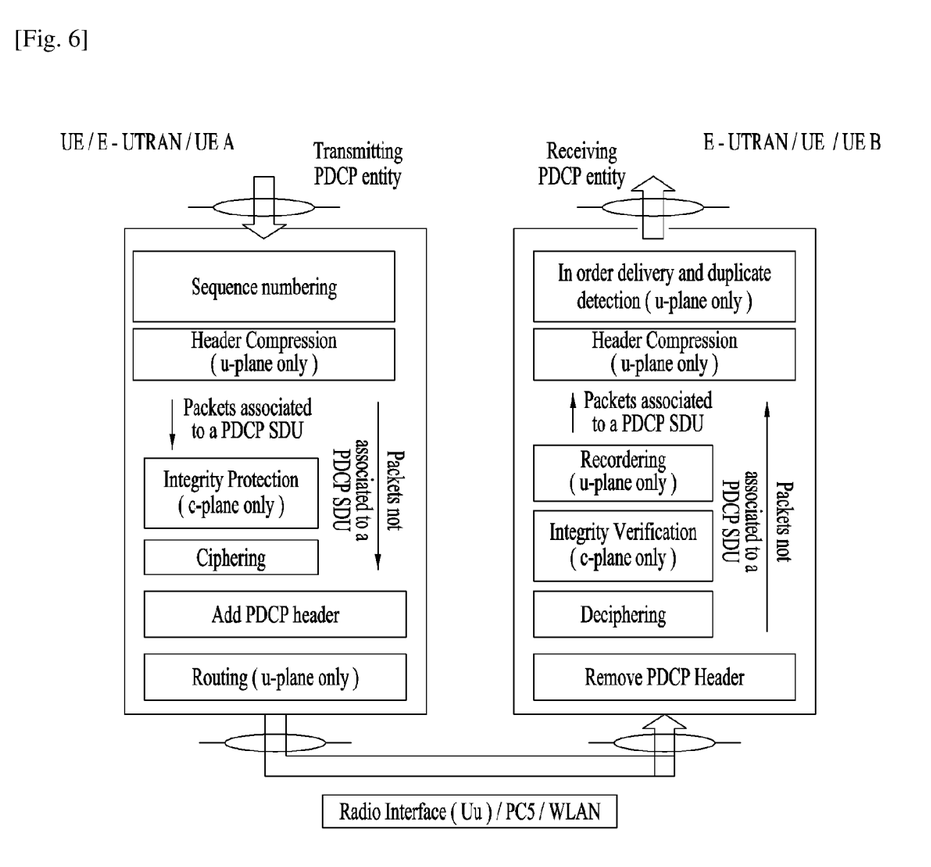
FIG. 6 shows the functional view of the PDCP entity for the PDCP sublayer.

FIG. 6 shows the functional view of the PDCP entity for the PDCP sublayer.

As shown in FIG. 6, in uplink transmission, the transmitting PDCP entity can be located in UE and the receiving PDCP entity can be located in E-UTRAN. In downlink transmission the positions are opposite. For sidelink transmission, the transmitting PDCP entity is located in UE A and the receiving PDCP entity can be located in UE B.

The transmitting PDCP entity can perform sequence numbering and header compression (u-plane only). For the packets associated with a PDCP SDU, integrity protection (c-plane only) and ciphering can be performed. The transmitting PDCP entity also performs PDCP header addition and routing (u-plane only).

The receiving PDCP entity may perform the corresponding operations.

For RNs, integrity protection and verification are also performed for the u-plane.

For split and LWA bearers, routing is performed in the transmitting PDCP entity, and reordering is performed in the receiving PDCP entity.

Figure 7:
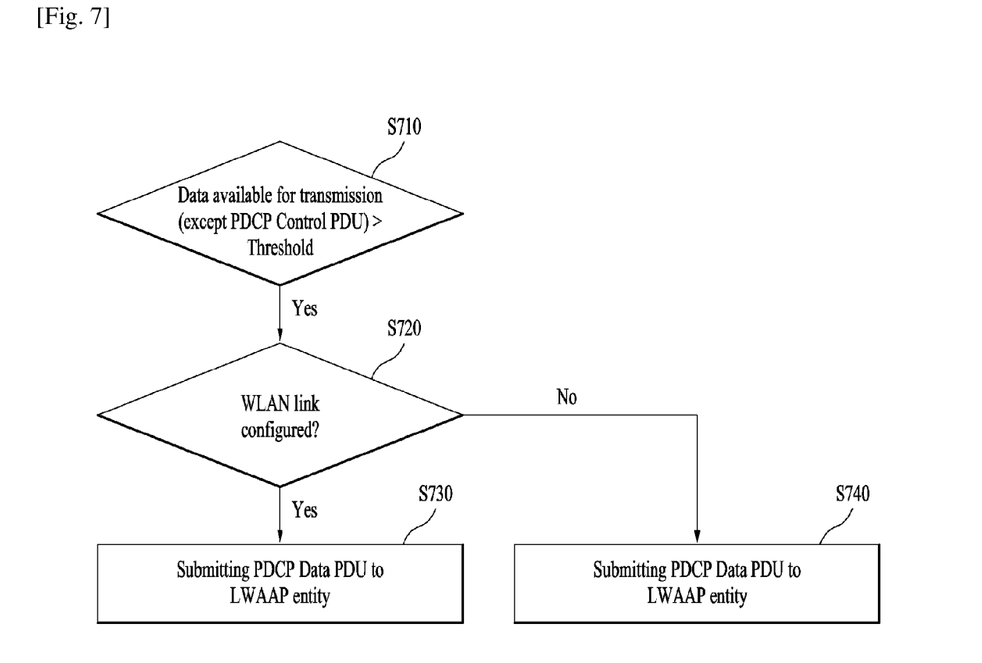
FIG. 7 is for the procedure for the PDCP entity for submitting PDCP PDUs according to one embodiment of the present invention.

FIG. 7 is for the procedure for the PDCP entity for submitting PDCP PDUs according to one embodiment of the present invention.

For LWA bearers, when submitting PDCP PDUs to lower layers, the transmitting PDCP entity may first determine whether the data available for transmission exceeds a predetermined threshold value (S710). Here, according to option 1 of the embodiment, the size of PDCP Control PDU is excluded from data available for transmission. Specifically, the transmitting PDCP entity may determine if ul-LWA-DataSplitThreshold. is configured and the data available for transmission, excluding PDCP Control PDUs, is larger than or equal to ul-LWA-DataSplitThreshold.

If it is determined as yes, the transmitting PDCP entity may submit the PDCP Data PDUs to either the associated AM RLC entity upon request from lower layers or the associated LWAAP entity.

The transmitting PDCP entity may further determine whether WLAN link is configured (S720). Specifically, the transmitting PDCP entity may determine if ul-LWA-DRB-ViaWLAN is set to TRUE by upper layers.

If the ul-LWA-DRB-ViaWLAN is set to TRUE, the transmitting PDCP entity may submit the PDCP Data PDUs to the associated LWAAP entity (S730). If the WLAN link is not configured, the transmitting PDCP entity may submit the PDCP Data PDUs to the associated AM RLC entity upon request from lower layers (S740).

It should be noted that, according to the present embodiment, the transmitting PDCP entity submits the PDCP Control PDUs to the associated AM RLC entity upon request from lower layers, regardless of the determinations at steps S710 and S720. Thus, according to option 1, the data available for transmission excludes the size of PDCP Control PDU when comparing to the threshold.

The above procedure is explained in view of LWA bearer, but it can be applied for other bearers having at least two links.

Proposed BSR Transmission

For the purpose of MAC buffer status reporting, the UE shall consider PDCP Control PDUs, as well as the following as data available for transmission in the PDCP layer.

For SDUs for which no PDU has been submitted to lower layers:
  the SDU itself, if the SDU has not yet been processed by PDCP, or
  the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
  the SDU, if it has not yet been processed by PDCP, or
  the PDU once it has been processed by PDCP.

For radio bearers that are mapped on RLC AM, if the PDCP entity has previously performed the data recovery procedure, the UE shall also consider as data available for transmission in the PDCP layer, all the PDCP PDUs that have only been submitted to re-established AM RLC entity prior to the PDCP data recovery, starting from the first PDCP PDU whose successful delivery has not been confirmed by lower layers, except the PDUs which are indicated as successfully delivered by the PDCP status report, if received.

Figure 8:
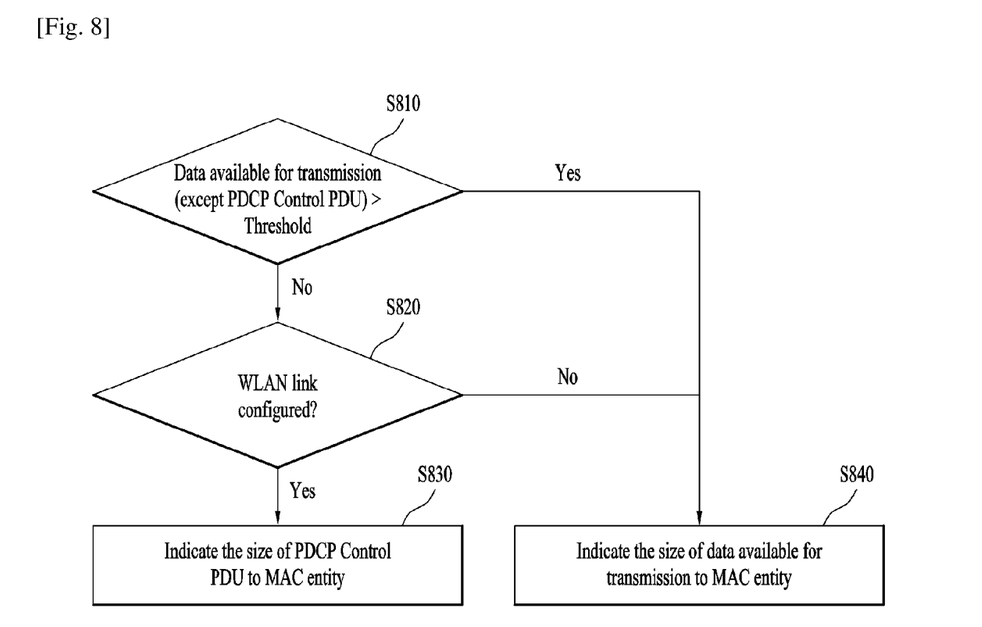
FIG. 8 shows the procedure for indication of the data availability to the MAC entity according to one embodiment of the present invention.

FIG. 8 shows the procedure for indication of the data availability to the MAC entity according to one embodiment of the present invention.

For uplink LWA bearers, when indicating the data available for transmission to the MAC entity for BSR triggering and Buffer Size calculation, the UE may first determine whether the size of data available for transmission exceeds a predetermined threshold (S810). Here, according to option 1 of the embodiment, the size of PDCP Control PDU is excluded from the size of data available for transmission. Specifically, the UE may determine whether ul-LWA-DataSplitThreshold is configured and the data available for transmission excluding PDCP Control PDUs is larger than or equal to ul-LWA-DataSplitThreshold. If the data available for transmission exceeds the threshold value, the UE may indicate the data available for transmission to the MAC entity (S840).

If the data available for transmission does not exceeds the threshold, the UE may further determines whether WLAN link is configured (S820). Specifically, the UE may determine if ul-LWA-DRB-ViaWLAN is set to TRUE by upper layer. If the WLAN link is configured, the UE indicates the size of PDCP Control PDU to the MAC entity (S830). That is, even when the PDCP Data PDU is subject to be transmitted through the LTE link, the PDCP Control PDU is restricted to be transmitted via WLAN link, thus the PDCP may inform the MAC entity the size of PDCP Control PDU to the MAC entity.

Specifically, if there is no PDCP Control PDU available for transmission, the UE may indicate the data available for transmission as 0 to the MAC entity. If there is PDCP Control PDU, the UE may indicate the size of PDCP Control PDUs available for transmission to the MAC entity.

If the WLAN link is not established, the UE may indicate the data available for transmission to the MAC entity (S840).

For option 1 and option2, if the data available for transmission is less than the threshold, and if the transmission path is set to WLAN, then the UE indicates to the MAC entity:

(1) 0, if there is no PDCP Control PDU available for transmission (2) The total size of PDCP Control PDUs, if there is at least one PDCP Control PDUs available for transmission.

For option 1, the total size of PDCP Control PDUs available for transmission is excluded from the data available for transmission when the data available for transmission is compared with the threshold.

Figure 9:
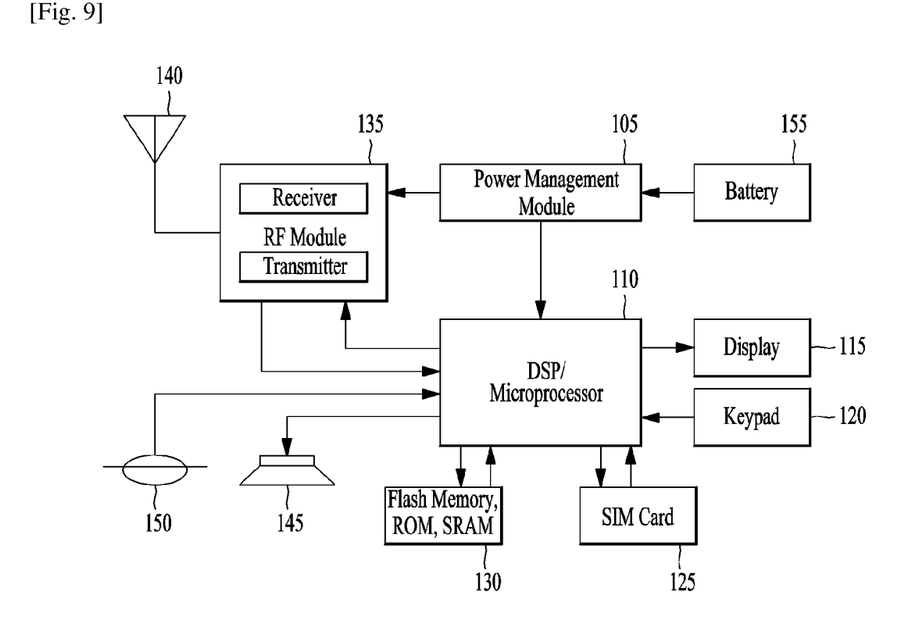
FIG. 9 is a block diagram of a communication apparatus according to an embodiment of the present invention.

FIG. 9 is a block diagram of a communication apparatus according to an embodiment of the present invention.

The apparatus shown in FIG. 9 can be a user equipment (UE) and/or eNB adapted to perform the above mechanism, but it can be any apparatus for performing the same operation.

As shown in FIG. 9, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 9 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 9 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP system, the present invention is applicable to a variety of wireless communication systems, e.g. IEEE system, in addition to the 3GPP system.

The invention claimed is:

1. A method for a user equipment (UE) for transmitting uplink data of a bearer including a first link and a second link to a network, the method comprising:

determining whether a first size exceeds a threshold value, wherein the first size is determined as a second size of data available for transmission in a PDCP (Packet Data Convergence Protocol) entity of the UE minus a third size of a PDCP Control PDU (Protocol Data Unit), wherein the PDCP Control PDU is predetermined as information transmitted through the first link of the bearer among the first link and the second link regardless of the determination on whether the first size exceeds the threshold value;

providing a first indication to a first entity of the UE, by the PDCP entity of the UE, of the second size of the data available for transmission for the first link based on the determination that the first size exceeds the threshold value; and transmitting, by the first entity, a buffer status report for the second size to the network based on the indication;

providing a second indication to the first entity of the UE, by the PDCP entity of the UE, of the third size based on the determination that the first size does not exceed the threshold value.

2. The method of claim 1, wherein the third size is indicated as 0, when there is no PDCP Control PDU available for transmission.

3. The method of claim 1, further comprising:
submitting the data to the first entity of the UE for the first link or a second entity of the UE for the second link based on whether the first size exceeds the threshold value.

4. The method of claim 1, wherein the first link is a LTE (Long Term Evolution) link, and the second link is a WLAN (Wireless Local Area Network) link.

5. A user equipment (UE) for transmitting uplink data of a bearer including a first link and a second link to a network, the UE comprising:
a processor including a PDCP (Packet Data Convergence Protocol) entity, a first entity for the first link, and a second entity for the second link; and
a transceiver operatively connected to the processor, wherein the PDCP entity is configured to determine whether a first size exceeds a threshold value, wherein the first size is determined as a second size of data available for transmission in a PDCP (Packet Data Convergence Protocol) entity of the UE minus a third size of a PDCP Control PDU (Protocol Data Unit), wherein the PDCP Control PDU is predetermined as information transmitted through the first link of the bearer among the first link and the second link regardless of the determination on whether the first size exceeds the threshold value, wherein the PDCP entity is further configured to provide a first indication of the second size of the data available for transmission to the first entity based on the determination that the first size exceeds the threshold value; and wherein the first entity is configured to transmit a buffer status report for the second size, through the transceiver, to the network based on the indication;

the PDCP entity is further configured to provide a second indication of the third size to the first entity based on the determination that the first size does not exceed the threshold value.

6. The UE of claim 5, wherein the third size is indicated as 0, when there is no PDCP Control PDU available for transmission.

7. The UE of claim 5, wherein the PDCP entity is further configured to submit the data to the first entity of the UE for the first link or the second entity of the UE for the second link based on whether the first size exceeds the threshold value.

8. The UE of claim 5, wherein the first link is a LTE (Long Term Evolution) link, and the second link is a WLAN (Wireless Local Area Network) link.

* * * * *